Figure 1:
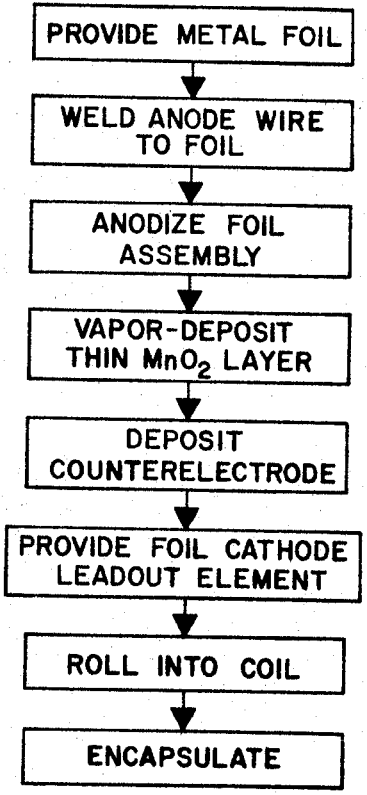

May 16, 1967 J. E. RILEY 3,320,494
METHOD AND CAPACITOR COMPRISING OXIDE ELECTROLYTE
DERIVED FROM PERMANGANIC ACID
Filed Nov. 12, 1963

James E. Riley
INVENTOR.

BY

United States Patent Office 3,320,494
Patented May 16, 1967

3,320,494
METHOD AND CAPACITOR COMPRISING OXIDE ELECTROLYTE DERIVED FROM PERMANGANIC ACID
James E. Riley, Parma Heights, Ohio, assignor to Texas Instruments Incorporated, Dallas, Tex., a corporation of Delaware
Filed Nov. 12, 1963, Ser. No. 322,768
4 Claims. (Cl. 317—230)

The present invention relates to electric capacitors and more particularly to capacitor devices employing solid state electrolytes.

It is known that a current-blocking film can be electrochemically formed on certain elements such as tantalum, aluminum, niobium, silicon, titanium, zirconium, and others. This film is usually a very stable oxide and serves to block the flow of current if placed into a sandwich between appropriately biased electrodes. It can be prepared in a number of ways, and is commonly produced, as on tantalum, by making the metal anodic in a suitable conducting oxygen-ion supplying solution with a metallic cathode and causing the current to flow. In order to maintain a constant flow of current, it is necessary to raise the applied potential at an approximately linear rate. Upon reaching a predetermined potential, and if the potential remains substantially constant, showing that the process is virtually complete, the current will gradually decrease to a very low value.

The thickness of the tantalum oxide film prepared in this manner is a function of the (1) potential applied, (2) temperature at which the formation is performed, (3) the period of time held at the constant potential, as wall as (4) the composition of the formation electrolyte. As it applies to other metal oxides, generally, the same variables must be closely controlled for maximum capacitance values. In porous plug devices, metallic composition, particle size, shape, and pressed density are especially important since they influence the final structure of the dielectric film. An excellent discussion of this appears in the Journal of the Electrochemical Society, vol. 102, 1955, p. 176.

A metal anode, and an overlying dielectric layer, plus an electrolyte sometimes acting as a counterelectrode, and a cathode, comprise the conventional capacitor. A metal container is employed as the cathode in some configurations, with electrical contact being provided through an appropriate weld, solder, conductive paste, or other suitable means.

Porous sintered anode types of electrolytic capacitors may be conveniently divided into (1) "dry solid," and (2) "wet solid" structures. When using tantalum, each employs a metal anode produced by pressing high purity tantalum powder into a compact, usually in cylindrical form, with subsequent sintering of the compact under high vacuum. The other common type, (3) "wet foil," uses metal foil for both the anode and cathode plates, with the appropriate liquid or paste electrolyte to complete the capacitor structure. A new type (4) "dry foil" is disclosed hereinbelow.

The first three basic types of capacitors have serious limitations when compared to the novel capacitor of the instant invention. Over a period of time, much effort has been expended in the development of a capacitor which would eliminate the liquid electrolyte, and all of its attendant problems, which include loss of the electrolyte itself, temperature instability, corrosion, and so forth. While the dry or solid electrolyte capacitor has solved many of these problems and has extended the capacitor art, many disadvantages still exist since the porous plug type is characterized by a low working voltage, and perhaps even more critical is the problem of reproducibility. Equally serious, due to present day requirement for electronic component and system reliability, is the porous plug type's rise in current leakage during extended use, lack of temperature versus conductivity uniformity, as well as the very common catastrophic breakdown occurring especially in low impedance circuit applications.

It is an object of this invention to overcome the foregoing and related disadvantages. More specifically, an object is to provide for dielectric devices compatible with sophisticated system reliability requirements by making possible a completely solid state structure.

Another object of this invention is to provide for a solid capacitor design of high performance characterized further by significantly improved volumetric efficiency.

A still further object of the invention is to make available flexible dielectric film sandwich structures and to provide for the realization of solid state electrolyte wound foil and porous plug devices.

A principal feature of the present invention is the employment of a continuous and highly adherent thin film electrolyte composition in tightly wound valve metal foil dielectric structures.

A particularly advantageous solid state capacitor can be obtained by selecting an especially prepared novel electrolyte of manganese oxide as the decomposition product of aqueous $HMnO_4$. The use of an oxide of a multi-valent transition metal appears necessary if the well known healing characteristics of solid electrolyte devices is to be achieved. The source of the manganese oxide electrolyte is through the extremely carefully controlled thermodecomposition of highly concentrated, permanganic acid, $HMnO_4$. The critical decomposition process for the permanganic acid must be precisely controlled so as to provide for the necessary adherence, film structure continuity, as well as electrical properties thereof.

In accordance with one embodiment of the instant invention, the solid state $MnO_2$ electrolyte is provided by a critically controlled $HMnO_4$ decomposition process which proceeds according to the following reaction:

$$2HMnO_4 \xrightarrow{\Delta} 2MnO_2 + H_2O + O_3\uparrow$$

There are several important process variables which must be precisely controlled to optimize the electrolytic application technique. The first variable and one of a critical nature is that of process temperature. This variable dramatically effects the character of the electrolyte material, including its crystalline structure, as well as bulk resistivity and other electrical characteristics. The second parameter involves the mechanics of the application of the permanganic acid itself which has been shown to be greatly responsible for the thickness, density, porosity, and general uniformity of the solid electrolyte layer. The third process parameter, involving such electrical parameters as power factor, thermal stability, and frequency stability will be a direct function of the solid state character of the electrolyte material. This solid state character is determined largely by its method of preparation as described herein. For this reason, investigations on structural configuration as a function of purity and temperature, chemical stability as a function of temperature and bulk resistivity as a function of purity and/or impurity concentrations and temperature have been made.

Detailed investigations show that it is necessary, if superior results are sought, to keep the $MnO_2$ electrolyte close to a noncrystalline or amorphous state. It is in this condition that the solid electrolyte has the capability of performing best its function of preventing the metallic counterelectrode from combining with defects in the anodic dielectric film. Adhesion of the dry electrolyte material to the anodized foil is also a direct function of basic structure. The adhesion falls off quite sharply as the electrolyte becomes less amorphous and more crystalline. This defect in the film becomes evident during the winding of the anode foil element. Lack of adherence is also important when considering its employment as an electrolyte or semiconductor in embodiments other than rolled foil capacitor structures.

It is, therefore, another object of this invention to provide a solid state valve metal rolled foil capacitor which employs an electrolyte consisting of amorphous $MnO_x$, "X" being preferably 2, but oxygen-to-manganese ratios of about 1.3 to 3.0 have been used. The valve metal, one which forms on anodic polarization an oxide film, is also utilized in the invention as the anode of the electrical device. The various valve metals and their properties are described by Young, Anodic Oxide Films, Academic Press, New York, 1961, p. 4, and include Ta, Nb, Al, Zr, Hf, W, Bi, Sb, Be, Mg, Si, Ge, Sn, Ti and U.

The working functions of the semiconductor electrolyte in the present capacitor are complex, and not completely understood. This material constitutes the major difference between the "solid" and "wet" types. The electrolyte semiconductor $MnO_2$ material must normally fulfill the following requirements:

(1) Provide electrical contact to the anodic oxide dielectric film;

(2) Provide a low stable resistance, insensitive to temperature, voltage and frequency;

(3) Be chemically inert and substantially non-reactive with the anodic dielectric film, and (4) Be readily applied in continuous thin films.

Structural damage to the dielectric sandwich, especially to the dielectric film itself, is normally repaired in the capacitor industry by providing for a reforming cycle. This cycle consists of replacing the dielectric assembly into a bath for further growth of a dielectric film, similar to the original anodic oxide film preparation. This cycle anodically heals the oxide film imperfections and thereby reduces the leakage currents to some tolerable value for capacitor applications.

I have found that a satisfactory electrical capacitor element can be manufactured without this expensive and time consuming reforming process. The industry practice of high temperature pyrolytic decomposition of an aqueous manganous nitrate solution to produce a crystalline $MnO_2$ deposit, adversely affects the dielectric sandwich structure. Furthermore, the reforming processes of industry normally makes oxygen available to dope both the $MnO_2$ electrolyte and ultimately the outer layers of the metal oxide, for example the $Ta_2O_5$, by a mechanism of field-aided diffusion of the oxide ion through the $MnO_2$ to the $Ta_2O_5$—$MnO_2$ interface. This oxygen doping of the $MnO_2$ lowers the resistivity and the dissipation factor as well. Other deleterious influences involve D.C. leakage through oxygen doping of the $Ta_2O_5$ p-type at the same interface.

Figure 3:
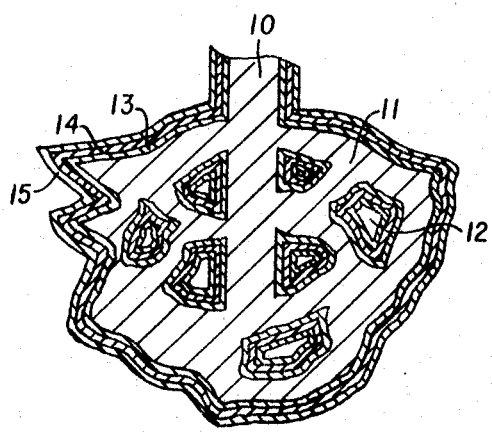
Figure 2:
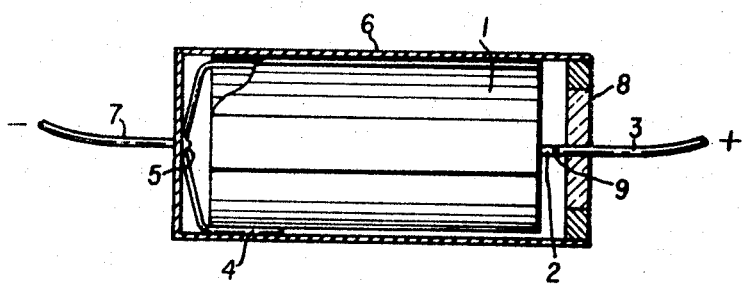

The novel features believe characteristic of the instant invention are set forth in the appended claims. A more detailed description of this invention can be obtained by considering further the following detailed specification and the appended drawings, in which:

FIG. 1 is a flow-chart describing the step-by-step method of preparing one embodiment of the invention, FIG. 2 illustrates an electrical capacitor constructed in accordance with this invention, FIG. 3 shows a porous plug capacitor element provided in accordance with this invention.

In forming a device of the instant invention, the stepwise process as described by FIG. 1 includes, providing a strip of suitable capacitor grade metal foil, such as tantalum, approximately 0.0005 by 0.5 by 6.5 inches, with a suitably connected tantalum lead, which is then anodized so as to provide a favorable working voltage for the finished capacitor. Due to the inherent chemical stability of tantalum, and especially the amorphous form of tantalum pentoxide in many conductive solutions, a number of electrolyte systems could be employed in this step. For ratings of lower voltages, a solution containing approximately 1% by weight phosphoric acid in de-ionized water at approximately 90° C. is suitable for use as a formation electrolyte. For the development of higher working voltages, formation electrolytes using ethylene glycol, de-ionized water, and phosphoric acid at temperatures up to 180° to 200° C. have shown promise of improved dielectric stability. The electrochemical process entails the application of constant current, allowing the voltage to rise to some predetermined value. At this point, constant voltage is applied to the electrode and the current in the system falls off in a logarithmic manner. The next step involves the evaporation of concentrated permaganic acid onto the $Ta_2O_5$ dielectric layer which is maintained at a temperature of about 80° C. to provide in-situ deposition of an amorphous $MnO_2$ film about 10,000 A. in thickness. After deposition of the solid state electrolyte, a layer of metallic gold is evaporated, under vacuum, onto the electrolyte material to serve as the counterelectrode.

The capacitor anode structure, now consists of an anodized strip of capacitor grade tantalum foil, coated on both sides by a thin amorphous layer of manganese oxide solid electrolyte material and having a thin layer of gold making contact therewith. A strip of metalized plastic film is also integrally wound into the spiral assembly. This aluminized plastic (Mylar is suitable) strip serves as the cathode leadout element from the internal surface areas of the wound spiral of the capacitor. This composite structure is then wound around itself into a very tight and compact spiral assembly. An additional metal wire, such as nickel, is welded to the tantalum anode wire tied to the anodic foil in the spiral assembly.

The capacitor element is now complete except for encapsulation. Packaging the structure is accomplished by sealing into a hermetic type containing means, with the anode connecting wire passing through a glass-to-metal hermetic seal, as illustrated in FIG. 2. For applications involving less stringent environmental performance, the capacitor element can be encapsulated in non-metallic casings such as, for example, organic resins. Various aging and testing methods, which are then employed on the devices, are aimed at the detection and elimination of early failures and to assure high reliability.

Referring now to FIG. 2, there may be seen an embodiment of this invention which includes a capacitor comprising a 1 layered assembly consisting of Ta metal foil with oxide layers on both sides and thereupon provided with a thin film of manganese oxide and subsequent layers of evaporated gold and an elongated sheet of Al coated (both sides) plastic forming the leadout cathode. The tantalum anode 2 is the positive terminal with a nickel positive terminal wire 3 welded 9 thereto. The nickel negative terminal 4 is in intimate electrical contact with the Al coated plastic sheet and is solder connected 5 to the brass container 6 and is provided with a lead wire extension 7. The opposite end plate 8 is constructed of a glass-metal circular sealing member to completely encapsulate the capacitor element.

Referring now to FIG. 3, there is illustrated a porous plug capacitor interior structure comprising a tantalum metal anode 10, or some other valve metal such as Nb, Al or Si, and surrounded by compressed tantalum particles 11 in intimate contact therewith excepting for voids 12 dispersed throughout the compacted particles. The tantalum particles form a substantial part of one electrode of the capacitor and thus there is good electrical continuity provided between all of the particles, and made possible by interparticle fusion through a high temperature particle sintering step. The dielectric layer 13 is produced on all of the free surfaces of the plug usually by anodizing in a suitable electrolyte making the anode 10 the positive terminal of the voltage supply and the negative terminal to a suitable electrode such as platinum in the anodizing solution, and maintaining constant current through this series circuit until the voltage across the two electrodes rises to a selected maximum value. In contigous relationship with the formed dielectric layer 13 in a solid state electrolyte film 14 composed of manganese oxide which also functions as a counterelectrode in the capacitor assembly. This oxide of manganese thin film 14 is provided through a low temperature decomposition (about 80° C.) of $HMnO_4$ which has been deposited onto the dielectric layer 13 throughout the entire porous plug while under positive pressure and while maintaining the porous plug at room temperature. There may also be provided an electrode layer 15, making contact with the manganese oxide film 14, which consists of carbon, produced from the decomposition of a chlorocarbon solution, and gold paint. Silver, or some other readily solderable conductor, might also be employed in lieu of the gold. The assembly is now ready for encapsulation by any conventional technique, such as by inserting into a metal can followed by potting and sealing.

In accordance with an embodiment of the invention, there is provided an electric capacitor element comprising (a) an amorphous manganese oxide electrolyte, (b) a tantalum foil anode electrode, (c) a tantalum pentoxide dielectric film, (d) gold counter electrode making electrical connection to the electrolyte and (e) provided in an appropriate metal containing means with (f) lead wires suitably connected. Niobium is also suitable.

If desired, the capacitor container might be selected from the severe-environment packages suggested by Dummer and Nordenberg, Fixed and Variable Capacitors, McGraw-Hill Company, New York, 1960, or the technique disclosed by Haberecht and Van Tassel in application Ser. No. 229,833, assigned to the assignee of the present invention, may be employed, especially for "dry solid" types.

A feature of this invention is the providing of a flexible solid state electrolyte which enables the preparation of tightly wound capacitor structures. This novel feature also provides for etched or unetched valve metal solid electrolyte dielectric assemblies in unwound structures as well. In the amorphous state, and in very thin films, the manganese oxide, usually $MnO_2$, provides for a solid state electrolyte which is capable of preventing the metallic mobile electric counterelectrode from combining with defects or imperfections in the anodic dielectric film, and has been found to also make unnecessary the customary reforming cycle during capacitor manufacture.

The manganese oxide electrolyte is provided through the decomposition of a highly concentrated solution of permanganic acid, $HMnO_4$, and is found to produce a flexible electrolyte when it is deposited onto the dielectric film at temperatures in the range of 20° C. to 100° C., with 80° C. being preferable. Actually, the oxide of manganese is produced in situ on the slightly heated dielectric film during the spraying or evaporation step. The thickness of the applied manganese oxide film is of the order of several molecular layers up to 50,000 A. By employing gas phase methods, it is found possible to obtain monomolecular thicknesses, and to secure rather exacting layer thicknesses while maintaining continuity of electrolyte film. When manganese oxide layers much thicker than about 50,000 A. units are deposited, they are less adherent and fail to effectively serve their purpose, and are particularly undesirable when considering wound foil structures.

Use of colloidal $MnO_2$ in the size range of less than 20 microns, as an electrolyte, has the advantage of allowing careful control of the manganese-to-oxygen ratio while precluding the necessity of pyrolysis and its attendant problems, and has been found particularly useful in tantalum solid slug devices. Organometallics of manganese have also been employed for $MnO_2$ electrolyte preparation with manganese carbonyl giving the best results. Reduction of the permanganate ion to $MN^{+4}$ without the evolution of oxides of manganese lower than $MnO_2$ has also been employed and it has been found that formic acid provides a very pure, virtually colloidal $MnO_2$ when reacted with $HMnO_4$. Methyl alcohol, acetone, and formaldehyde have also been found useful.

A thin layer of highly adherent $MnO_2$ can be applied to anodic dielectric films by evaporating a boiling solution of $HMnO_4$ onto the heated anodic substrate, or for greater control a reduced pressure evaporation may be employed, such as a "cloud chamber" technique. A significant improvement in life tests as well as manufacturing yields have been obtained by utilizing aqueous $HMnO_4$ as the anodizing electrolyte. In this process, the metallic foil or porous plug of Ta is anodized in aqueous $HMnO_4$ with subsequent direct application of a metallic counterelectrode. It is thus apparent that selected methods of pyrolytic, chemical, or electrolytic decomposition of $HMnO_4$ can be advantageously utilized.

By depositing a very thin film of $MnO_2$ onto a dielectric as a counterelectrode, a device can be prepared which becomes independent of the density of imperfections and is especially useful after exposure to high current densities. The manganese dioxide, as deposited, has a resistivity of about 100 ohm-cm., whereas after conversion to a lower oxide form after exposure to high currents, this film resistivity increases dramatically to about $10^8$ ohm-cm. and is very effective in "healing" dielectric layer imperfections. Manganese oxide, prepared in accordance with this invention, is also useful in various thin film dielectrics, especially those based on oxides. Nitrides, particularly boron and silicon nitrides, can be used.

Solid electrolytic valve metal porous plug capacitors have also been produced by utilization of $HMnO_4$ as the electrolyte source material with significantly improved results. The permanganate acid is applied to the anode under high pressure, with from 1,000 to 2,500 p.s.i.g. of argon being suitable to effect good saturation. The anode is then pyrolyzed at a low temperature to effect decomposition of the $HMnO_4$. The anode is not damaged by this technique and a marked improvement over use of pyrolyzed manganous nitrate is observed. Assemblies prepared by the invention will instantaneously return to their voltage of anodization when placed on a reform at standard conditions. Furthermore, due to the very thin and uniform film thicknesses when using $HMnO_4$ the necessity of mechanical sizing is eliminated, resulting in additional process time savings and the elimination of possible anode damage during sizing operations. And of course, the absence of detrimental decomposition byproducts is highly advantageous. Use of amorphous thin films of manganese oxide, in accordance with this invention, as counterelectrodes and/or electrolytes for vapor phase or electrochemically deposited two-dimensional thin film semiconductor microcircuitry is also particularly desirable since such close control is possible. Furthermore, film thicknesses can be accurately controlled providing for higher volumetric efficiencies without sacrificing loss in electrical parameters. It is particularly useful as part of a tantalum or silicon oxide dielectric sandwich structure.

Providing ohmic contact to the low resistivity p-type oxide of manganese electrolyte is rather simple. The use of colloidal graphite followed by a silver paste is one method, or a metal such as gold, silver, aluminum, nickel, manganese, etc., can be evaporated, sprayed, sputtered, brushed, etc., onto the $MnO_2$. Evaporated gold has been found particularly useful as an electrode forming layer for tightly wound structures, whereas silver paint for porous plug types is found advantageous.

Test data shows that most the electrical parameters of the tantalum foil solid electrolyte capacitor, manufactured in accordance with this invention, are comparable to those of the tantalum wet foil type while retaining the significantly improved characteristics hereinabove identified. Capacitance per unit volume of the solid foil is high, and power factor values of 3 to 10% have been realized. Hermetically sealed devices are capable of a working voltage of 150 volts D.C. with leakage current values of 20 μa. (5 min.). Improvements in thin film large area capacitors, solid, porous, as well as foil, have also been realized by practicing the instant invention, using various etched and unetched valve metals.

It may thus be seen that the invention is broad in scope and includes such modifications as will be apparent to those skilled in the art, particularly after benefiting from the teachings and equivalents disclosed herein, and as specifically embraced within the invention. It is to be understood that the invention is not limited to the specific embodiments hereof, excepting as defined in the appended claims.

Having thus described my invention, I claim:

What is claimed is:

1. A rolled foil solid state electrolyte capacitor comprising:
    (a) a tightly coiled valve metal elongated foil electrode,
    (b) an anodic oxide dielectric layer on each side of said foil electrode,
    (c) a thin film of manganese oxide electrolyte overlying the dielectric layer, said oxide electrolyte being the conversion product of permanganic acid deposited on said dielectric layer,
    (d) vapor deposited metallic counterelectrodes overlying said thin film of manganese oxide, and
    (e) a counterelectrode leadout assembly comprising a metallized elongated sheet having an electrically conducting wire bonded thereto.

2. A method for fabricating a rolled foil solid state electrolytic capacitor comprising:
    (a) coating a strip of valve metal foil with a thin dielectric layer;
    (b) heating said dielectric layer in the range of about 20° C. to about 100° C.;
    (c) evaporating concentrated permanganic acid onto said heated dielectric layer to form a thin layer of manganese oxide on said dielectric layer as a decomposition product of said acid;
    (d) forming a metal counterelectrode on said dielectric layer;
    (e) placing a metalized plastic film adjacent said counterelectrode to form a cathode lead out element and complete an elongated capacitor sandwich structure;
    (f) tightly coiling said sandwich structure into a spiral roll; and
    (g) encapsulating said tightly coiled sandwich structure to form the roll capacitor.

3. The method according to claim 2 wherein said dielectric layer is formed by anodizing said valve metal foil.

4. The method of claim 2 wherein said dielectric layer is heated to about 80° C.

References Cited by the Examiner

UNITED STATES PATENTS

| | | | |
|---|---|---|---|
| 1,906,691 | 5/1933 | Lilienfeld | 317—230 |
| 3,054,029 | 9/1962 | Wagner et al. | 317—230 |
| 3,066,247 | 11/1962 | Robinson | 317—230 |
| 3,123,894 | 3/1964 | Bonin | 317—230 |

JAMES D. KALLAM, *Primary Examiner.*